(12) United States Patent
Kita

(10) Patent No.: US 10,534,904 B2
(45) Date of Patent: Jan. 14, 2020

(54) INPUT PROCESSING SYSTEM, INFORMATION STORAGE DEVICE, INFORMATION PROCESSING DEVICE, AND INPUT METHOD

(71) Applicant: CASIO COMPUTER CO., LTD., Shibuya-ku, Tokyo (JP)

(72) Inventor: Kazunori Kita, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/490,361

(22) Filed: Sep. 18, 2014

(65) Prior Publication Data
US 2015/0089085 A1 Mar. 26, 2015

(30) Foreign Application Priority Data
Sep. 20, 2013 (JP) .................. 2013-195908

(51) Int. Cl.
*G06F 21/34* (2013.01)
*H04W 4/80* (2018.01)
(Continued)

(52) U.S. Cl.
CPC ........... *G06F 21/34* (2013.01); *H04M 1/7253* (2013.01); *H04W 12/02* (2013.01)

(58) Field of Classification Search
CPC ... G06F 3/00; G06F 3/14; G06F 3/023; G06F 3/1236; G06F 21/34; G04G 21/04; H04M 1/7253; H04W 12/02; H04W 4/008
(Continued)

(56) References Cited

U.S. PATENT DOCUMENTS 6,405,249 B1 *  6/2002  Matsuda ................ A63F 13/12
                                                 709/224
6,751,215 B1 *  6/2004  Kawanobe ............ H04Q 11/04
                                                 370/352
(Continued)

FOREIGN PATENT DOCUMENTS

JP      2003036247 A     2/2003
JP      2004015077 A     1/2004

OTHER PUBLICATIONS

Japanese Office Action dated Aug. 29, 2017 issued in counterpart Japanese Application No. 2013-195908.

*Primary Examiner* — Getente A Yimer
(74) *Attorney, Agent, or Firm* — Holtz, Holtz & Volek PC

(57) ABSTRACT

According to an embodiment of the present invention, there is provided an input processing system including: an information storage device; and an information processing device, in which the information storage device includes: an input information storage unit configured to store information for performing input processing and identification information so that both of the information corresponds to each other; an identification information receiving unit configured to receive the identification information from the information processing device; an information transmitting unit configured to transmit, to the information processing device, the information for performing input processing stored to correspond to the identification information received by the identification information receiving unit; an identification information storage unit configured to store the identification information; an identification information transmitting unit configured to transmit the identification information to the information storage device; and an information receiving unit configured to receive the information for performing input processing transmitted by the information transmitting unit.

17 Claims, 6 Drawing Sheets

(51) Int. Cl.
*H04W 12/02* (2009.01)
*G04G 21/04* (2013.01)
*H04M 1/725* (2006.01)

(58) Field of Classification Search
USPC .......................................................... 710/3
See application file for complete search history.

(56) References Cited

U.S. PATENT DOCUMENTS

| | | | |
|---|---|---|---|
| 8,818,276 B2* | 8/2014 | Kiukkonen | H04L 63/107 |
| | | | 455/41.2 |
| 2006/0019720 A1* | 1/2006 | Kakehi | H04M 1/6091 |
| | | | 455/569.2 |
| 2006/0059231 A1* | 3/2006 | Takatori | G06Q 10/107 |
| | | | 709/206 |
| 2009/0198987 A1* | 8/2009 | Sumioka | G06F 21/31 |
| | | | 713/1 |
| 2013/0237189 A1* | 9/2013 | Nishidai | H04W 12/06 |
| | | | 455/411 |
| 2013/0318262 A1* | 11/2013 | Hao | G06F 3/0673 |
| | | | 710/74 |
| 2014/0087768 A1* | 3/2014 | Kusakari | H04W 4/043 |
| | | | 455/456.6 |
| 2014/0298353 A1* | 10/2014 | Hsu | G06F 9/54 |
| | | | 719/313 |

* cited by examiner

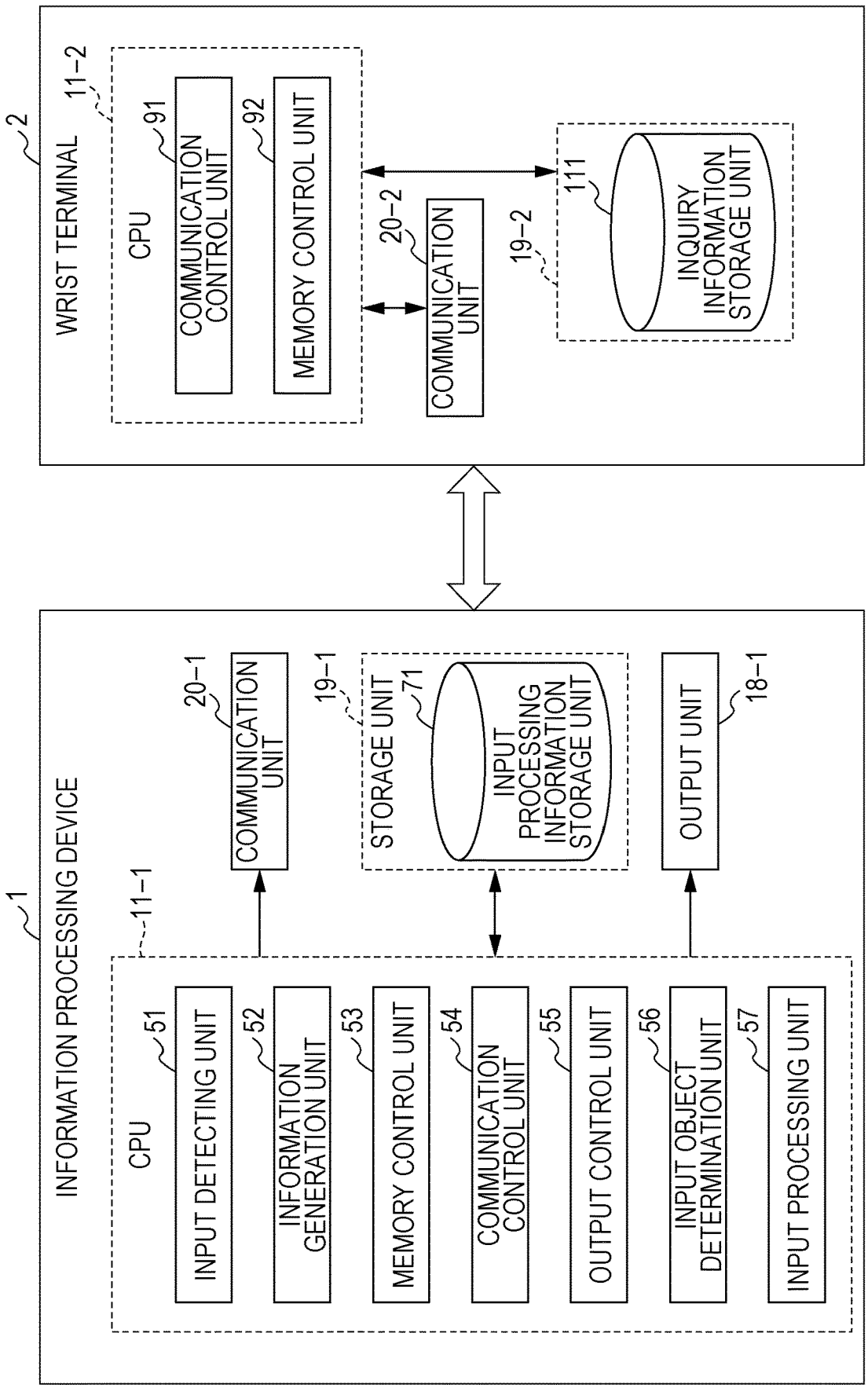

FIG. 4A

| INPUT NUMBERS | INPUT DESTINATIONS | STORAGE DESTINATIONS | INQUIRY NUMBERS |
|---|---|---|---|
| 1 | URL:www.xxx.co.jp/··· | MAIN BODY | 1 |
| 2 | URL:www.OOO.ne.jp/··· | PAIRING 1 | 1 |
| 3 | URL:www.△△△.com/··· | PAIRING 1 | 2 |
| 4 | □□□APP LOG-IN | MEMORY CARD | 1 |
| ⋮ | ⋮ | ⋮ | ⋮ |
| n | — | — | — |

FIG. 4B

| INQUIRY NUMBERS | INPUT OBJECT INFORMATION 1 | INPUT OBJECT INFORMATION 2 | ⋯ | INPUT OBJECT INFORMATION n |
|---|---|---|---|---|
| 1 | ID: OOO | PASSWORD: OOOOOO | ⋯ | — |
| 2 | NAME: HAMURA TARO | ADDRESS: TOKYO-TO HAMURA-SHI··· | ⋯ | — |
| 3 | ID: △△△ | PASSWORD: △△△△△△ | ⋯ | — |
| ⋮ | ⋮ | ⋮ | ⋮ | ⋮ |
| n | — | — | ⋯ | — |

INPUT PROCESSING SYSTEM, INFORMATION STORAGE DEVICE, INFORMATION PROCESSING DEVICE, AND INPUT METHOD

BACKGROUND OF THE INVENTION

1. Field of the Invention

The present invention relates to an input processing system, an information storage device, an information processing device, and an input method.

2. Description of the Related Art

There has been software that is equipped with a function of storing information entered once and making the information be automatically entered at the subsequent entering in entering login information for logging into a service on a website or in entering input information into a form field (refer to Japanese Patent Application Laid-Open Publication No. 2004-015077). Such a type of software integrally manages and stores information to be input in association with information on input destinations. The software, however, is disadvantageous in that an access to the managed information can reveal the place where the information to be input will be used, since the information on input destinations and the information to be input in association with the information on input destinations are stored together in a device having the software installed.

In order to address this problem, Japanese Patent Application Laid-Open Publication No. 2004-015077 describes a technique of storing input information such as a password into an external device that performs short-distance communications and acquiring the input information from the external device at each usage.

This technique, however, is exposed to the risk of the information including a password being specified if one of a mobile communication terminal and a personal information transmitter is analyzed, since both the mobile communication terminal and the personal information transmitter store the password.

BRIEF SUMMARY OF THE INVENTION

The present invention has been made in view of the above circumstances, and an object of the present invention is thus to provide an input processing system, an information storage device, an information processing device, and an input method which achieve higher levels of security by preventing a person from acquiring information necessary for input solely with a device associated with information input.

According to an embodiment of the present invention, there is provided an input processing system including: an information storage device; and an information processing device, in which the information storage device includes: an input information storage unit configured to store information for performing input processing and identification information so that both of the information corresponds to each other; an identification information receiving unit configured to receive the identification information from the information processing device; and an information transmitting unit configured to transmit, to the information processing device, the information for performing input processing stored to correspond to the identification information received by the identification information receiving unit; the information processing device includes: an identification information storage unit configured to store the identification information; an identification information transmitting unit configured to transmit the identification information to the information storage device; and an information receiving unit configured to receive the information for performing input processing transmitted by the information transmitting unit.

Further, according to an embodiment of the present invention, there is provided an information storage device including: an input information storage unit configured to store information for performing input processing and identification information so that both of the information corresponds to each other; an identification information receiving unit configured to receive the identification information from an external device; and an information transmitting unit configured to transmit, to the external device, the information for performing input processing stored to correspond to the identification information received by the identification information receiving unit.

Furthermore, according to an embodiment of the present invention, there is provided an information processing device including: an identification information storage unit configured to store identification information used for identifying information for performing input processing stored in an external device, an identification information transmitting unit configured to transmit the identification information to the external unit; and an information receiving unit configured to receive the information for performing input processing transmitted from the external device.

Moreover, according to an embodiment of the present invention, there is provided an input method that is executed by an information storage device having an input information storage unit and by an information processing device having an identification information storage unit, the input information storage unit being configured to store information for performing input processing and identification information so that both of the information corresponds to each other, and the identification information storage unit being configured to store the identification information, in which the input method includes the steps of: transmitting the identification information to the information storage device by the information processing device; receiving the identification information transmitted from the information processing device by the information storage device; and outputting the information for performing input processing corresponding to the received identification information to the information processing device.

BRIEF DESCRIPTION OF THE SEVERAL VIEWS OF THE DRAWING

FIG. 3 is a functional block diagram illustrating a functional configuration for executing input processing of the functional configurations of the information processing device and the wrist terminal in FIG. 1;

FIGS. 4A and 4B are drawings for describing information used in an input system;

DETAILED DESCRIPTION OF THE INVENTION

An embodiment of the present invention will be hereinafter described with reference to the drawings.

Figure 1:
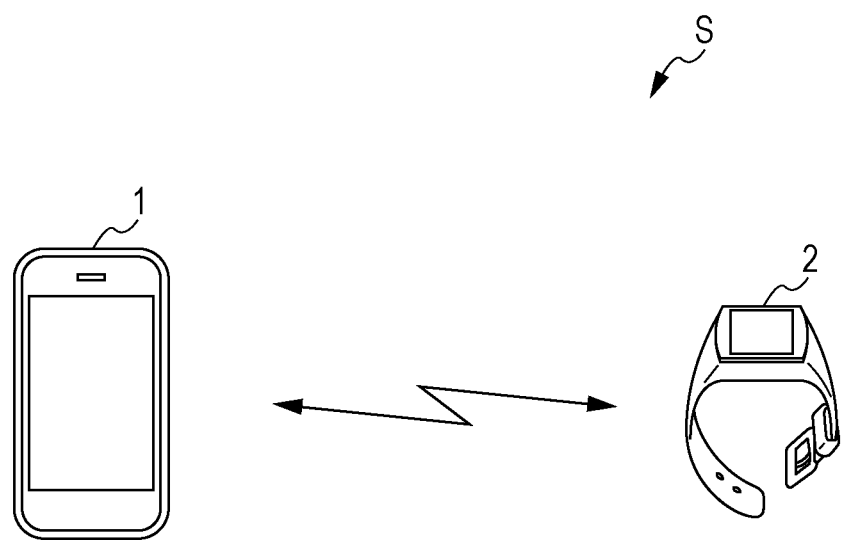
FIG. 1 is a system configuration diagram illustrating a system configuration of an input system.

FIG. 1 is a system configuration diagram illustrating a system configuration of an input system.

An input system S includes an information processing device 1 and a wrist terminal 2 as shown in FIG. 1.

The information processing device 1 is configured to enable viewing of a website or editing of a file, for example. The wrist terminal 2 is configured to pair with the information processing device 1 in a short-distance wireless communication standard such as NFC (Near Field Communication) or Bluetooth and be capable of data exchange with the information processing device 1.

The input system thus configured has a function of allowing registered information to be automatically input when viewing of a website or editing of a file, for example, is performed in the information processing device 1. The automatically input information (hereinafter referred to as input information) is stored in an external device such as the body of the information processing device 1 or the wrist terminal 2. If input information is stored in an external device such as the wrist terminal 2, the information required for viewing a website or editing a file, for example, is not stored with the information on a target website or a target file but is stored in the form of actual raw data to be input. Hence, if the input information has been stolen from the wrist terminal 2, the input information alone cannot determine the application of the information. Therefore, the security of the input system S can be increased when information including ID and a password necessary for logging into a specific website is stored.

Figure 2:
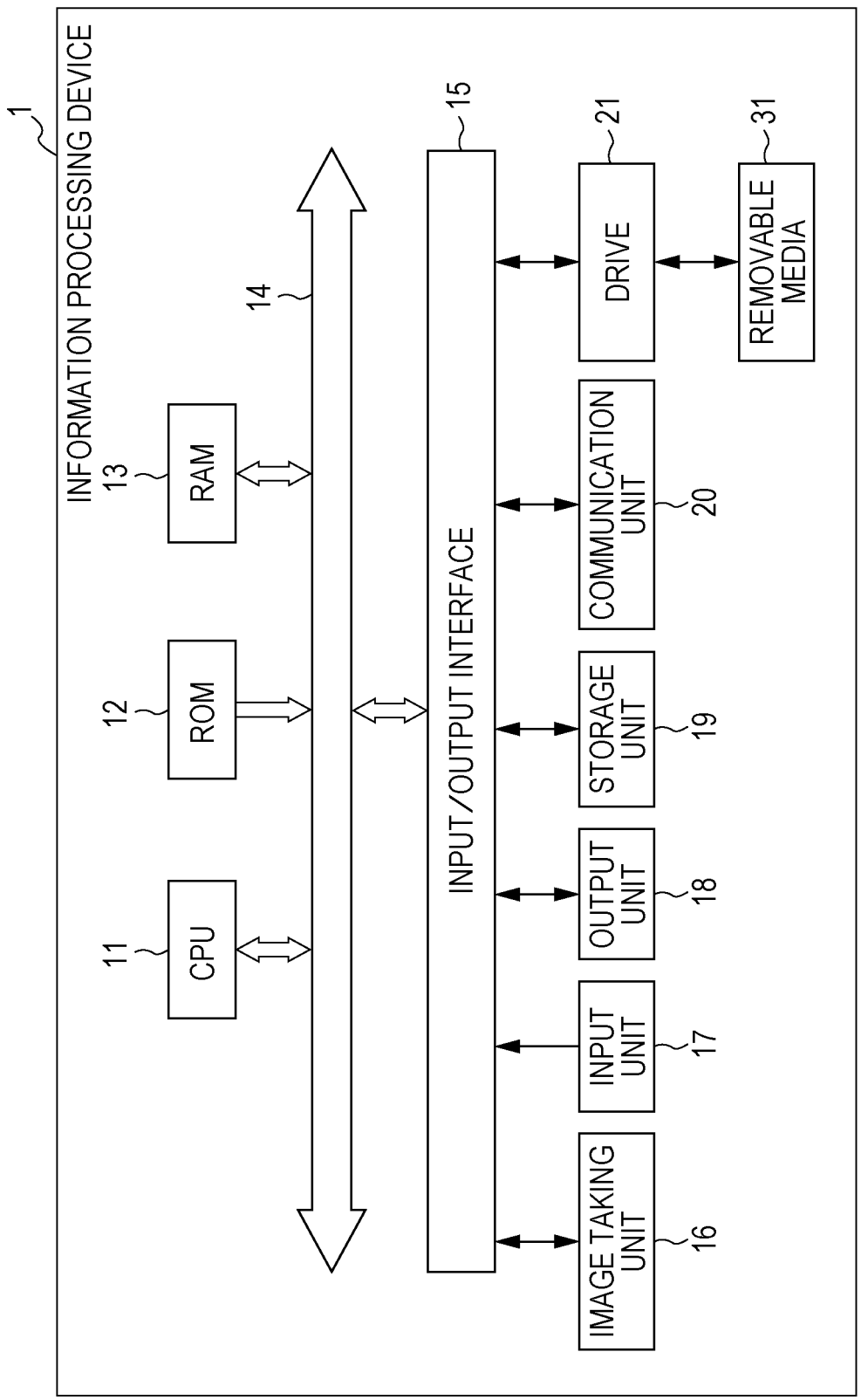
FIG. 2 is a block diagram illustrating a configuration of hardware of an information processing device according to an embodiment of the present invention.

FIG. 2 is a block diagram illustrating a configuration of hardware of the information processing device 1 according to an embodiment of the present invention. The information processing device 1 is a mobile terminal such as a smartphone.

The information processing device 1 includes a central processing unit (CPU) 11, a read only memory (ROM) 12, a random access memory (RAM) 13, a bus 14, an input/output interface 15, an image taking unit 16, an input unit 17, an output unit 18, a storage unit 19, a communication unit 20, and a drive 21.

The CPU 11 executes different types of processing in accordance with programs stored in the ROM 12 or programs loaded from the storage unit 19 into the RAM 13.

The RAM 13 adequately stores data, for example, that is necessary when the CPU 11 executes different types of processing.

The CPU 11, ROM 12, and RAM 13 are connected to one another via the bus 14. To the bus 14, the input/output interface 15 is connected. To the input/output interface 15, the image taking unit 16, the input unit 17, the output unit 18, the storage unit 19, the communication unit 20, and the drive 21 are connected.

The image taking unit 16 includes an optical lens unit and an image sensor not shown in the drawings.

The optical lens unit is formed of a condenser lens collecting lights for taking an image of an object, such as a focus lens or a zoom lens. A focus lens is a lens that forms an image of an object on a light receiving surface of the image sensor, and a zoom lens is a lens that freely changes a focus distance within a limited range. The optical lens unit is additionally provided as needed with a peripheral circuit that adjusts setting parameters including a focus point, exposure, and white balance.

The image sensor is formed of a photoelectric conversion element and an analog front end (AFE), for example. The photoelectric conversion element is, for example, a photoelectric conversion element of a complementary metal oxide semiconductor (CMOS) type. The photoelectric conversion element receives an image of an object emitted from the optical lens unit, and then photo-electrically converts (captures) the image and stores an image signal for a predetermined period of time. Further, the photoelectric conversion element sequentially supplies stored image signals to the AFE as analog signals.

The AFE executes different types of signal processing including analog/digital (A/D) conversion processing, on the analog image signals. Through the signal processing, digital signals are generated and are output as output signals of the image taking unit 16. The output signals of the image taking unit 16 will be hereinafter referred to as taken image data. The taken image data is adequately supplied to the CPU 11 and an image processing unit not shown in the drawings.

The input unit 17 is formed of different types of buttons, and inputs various types of information in accordance with instruction operations of a user. The output unit 18 is formed of a display or a speaker, for example, and outputs images or sounds. The storage unit 19 is formed of a hard disk or a dynamic random access memory (DRAM), for example, and stores data of images. The communication unit 20 controls communications with other devices (not shown in the drawings) via a network including the Internet.

The drive 21 is appropriately equipped with a removable media 31, which may be any one of a magnetic disk, an optical disk, a magneto-optical disk and a semiconductor memory, and so forth. The drive 21 reads a program from the removable media 31 and the program is installed into the storage unit 19 if necessary. The removable media 31 can store various data including the data of images stored in the storage unit 19 as the storage unit 19 can.

The wrist terminal 2 is formed as a watch device, for example. The wrist terminal 2 has the same configuration as the information processing device 1, except that the wrist terminal 2 does not have the image taking unit 16 and the drive 21 including the removable media 31, and the descriptions of the wrist terminal 2 will be thus omitted. It is to be noted that when the respective hardware configurations of the information processing device 1 and the wrist terminal 2 are to be separately mentioned, "–1" will be hereinafter attached to the reference numbers that denote the units of the information processing device 1 and "–2" will be hereinafter attached to the reference numbers that denote the units of the wrist terminal 2.

FIG. 3 is a functional block diagram illustrating a functional configuration for executing input processing of the functional configurations of the information processing device 1 and the wrist terminal 2 in FIG. 1. The input processing indicates processing of acquiring information necessary for viewing of a website, for example, from the wrist terminal 2 and making the information be automatically input when the information processing device 1 has accessed the website. In the meanwhile, exchange of information between the information processing device 1 and the wrist terminal 2 will be hereinafter conducted in a manner such that encoded information is output after device authentication and then the encoded information received is decoded.

The input processing by the information processing device 1 is performed via an input detecting unit 51, an information generation unit 52, a memory control unit 53, a communication control unit 54, an output control unit 55, an input object determination unit 56, and an input processing unit 57 in a CPU 11-1, as shown in FIG. 3.

Moreover, in one region of a storage unit 19-1, an input processing information storage unit 71 is set. In the input processing information storage unit 71 is stored information on an input destination, information necessary for input processing including the storage destination and the inquiry number of information to be input (hereinafter referred to as input object information), and information necessary for acquiring the input object information.

The information used in the input system S will be described. In the input system S, information associated with input is managed by a management application. FIGS. 4A and 4B are drawings for describing information used in the input system S.

The information used in the input system is separated into information stored in the information processing device 1 and information stored in the wrist terminal 2 described later.

The information stored in the information processing device 1 indicates the "input destination numbers", "input destinations", "storage destinations", and "inquiry numbers" as indicated in FIG. 4A. The "input destination numbers" are numbers automatically allotted when information is stored. The "input destinations" are the information on input destinations, and is specifically a URL in the case of a website and is a place of use in the case of an application. The "storage destinations" are places where the input object information is stored. The place is the wrist terminal 2 (pairing 1) in the embodiment, although the input object information may be stored in other places such as the storage unit 19 (main body) of the information processing device 1 and the removable media 31 (memory card) equipped via the drive 21 of the information processing device 1. The "inquiry numbers" are numbers serving as identification information when an inquiry is made about the acquisition of the input object information in the "storage destinations". In the embodiment, there are different inquiry numbers stored for different storage destinations, respectively. In the input system S, the information processing device 1 manages the input object information according to the "inquiry numbers" and therefore the input object information cannot be made available by the information processing device 1 alone.

On the other hand, the information stored in the wrist terminal 2 includes the "inquiry numbers" and "input object information 1 to n" as indicated in FIG. 4B. The "inquiry numbers" are numbers used when an inquiry is made about input object information by an external device. The "inquiry numbers" are automatically created when input object information is registered from an external device. The "input object information" is secure information to be input when input is performed, and is managed by a set of input destinations such as a website and a file. In the embodiment, the input object information includes not only ID and a password but also a name, an address, etc. for inputting individual information. Storing the "inquiry numbers" and the "input object information" alone in the wrist terminal 2 can prevent a person from knowing what the "input object information" is directly used for with the wrist terminal 2 only.

In FIG. 3 again, the input detecting unit 51 detects input of information. Specifically, the input detecting unit 51 detects input of information such as ID and a password or detects information that determines whether or not input information is to be the input object information, in viewing of a website.

The information generation unit 52 generates information related to input necessary for input (hereinafter referred to as input-related information). The information related to input necessary for input is the inquiry information and the input information including the input object information, for example. Specifically, the information generation unit 52 generates information with the items of "inquiry about input object information", "input destinations", and "storage destinations of input object information", for storage in the information processing device 1. Further, the information generation unit 52 generates, for each input set, input object information for an input destination for storage in the wrist terminal 2.

The memory control unit 53 controls the storage unit 19 so that the storage unit 19 stores information. More specifically, the memory control unit 53 controls the storage unit 19 so that the information with the items of "input destination of input object information" and "storage destination of input object information" can be stored in the input processing information storage unit 71 for storage in the information processing device 1. Consequently, the memory control unit 53 allows the information indicated in FIG. 4A to be stored into an inquiry information storage unit 111.

The communication control unit 54 controls the communication unit 20 so that information is input/output to other devices. More specifically, the communication control unit 54 control the communication unit 20 so that data is output to the wrist terminal 2 for storage in the wrist terminal 2, the data having information to be input separated in the items of "information 1" to "information n". Further, the communication control unit 54 acquires an inquiry number from the wrist terminal 2. The communication control unit 54 also sends an inquiry to the wrist terminal 2 about input information and acquires input information according to the inquiry.

The output control unit 55 controls the output unit 18 so that a website or a file, for example, is output and displayed so as to be viewed.

An input object determination unit 56 determines whether or not a website being viewed, for example is an input object. More specifically, the input object determination unit 56 makes a determination by checking against the input destinations stored in the input processing information storage unit 71.

The input processing unit 57 executes input processing. More specifically, the input processing unit 57 inputs input information acquired from the wrist terminal 2, into an input object (a website or a file, for example) as input processing.

The input processing in the wrist terminal 2 is performed via a communication control unit 91 and a memory control unit 92 in a CPU 11-2, as shown in FIG. 3.

Moreover, in one region of a storage unit 19-2, an inquiry information storage unit 111 is set. In the inquiry information storage unit 111, input object information is stored which corresponds to the inquiry number as shown in FIG. 4B.

The communication control unit 91 controls a communication unit 20-2 so that information is output from other devices. More specifically, the communication control unit 91 determines whether or not registration of input information has been requested. Further, the communication control unit 91 controls the communication unit 20 so that an inquiry number is output to the information processing device 1. In addition, the communication control unit 91 determines whether there is an inquiry about input information. Moreover, the communication control unit 91 controls the communication unit 20 so that input information for an inquiry number is output to the information processing device 1.

The memory control unit 92 makes input object information stored. More specifically, the memory control unit 92 controls the inquiry information storage unit 111 so that input object information is stored. In the control, the memory control unit 92 issues an inquiry number according to an input destination. Consequently, the memory control unit 92 allows the information indicated in FIG. 4B to be stored in the inquiry information storage unit 111.

Figure 5:
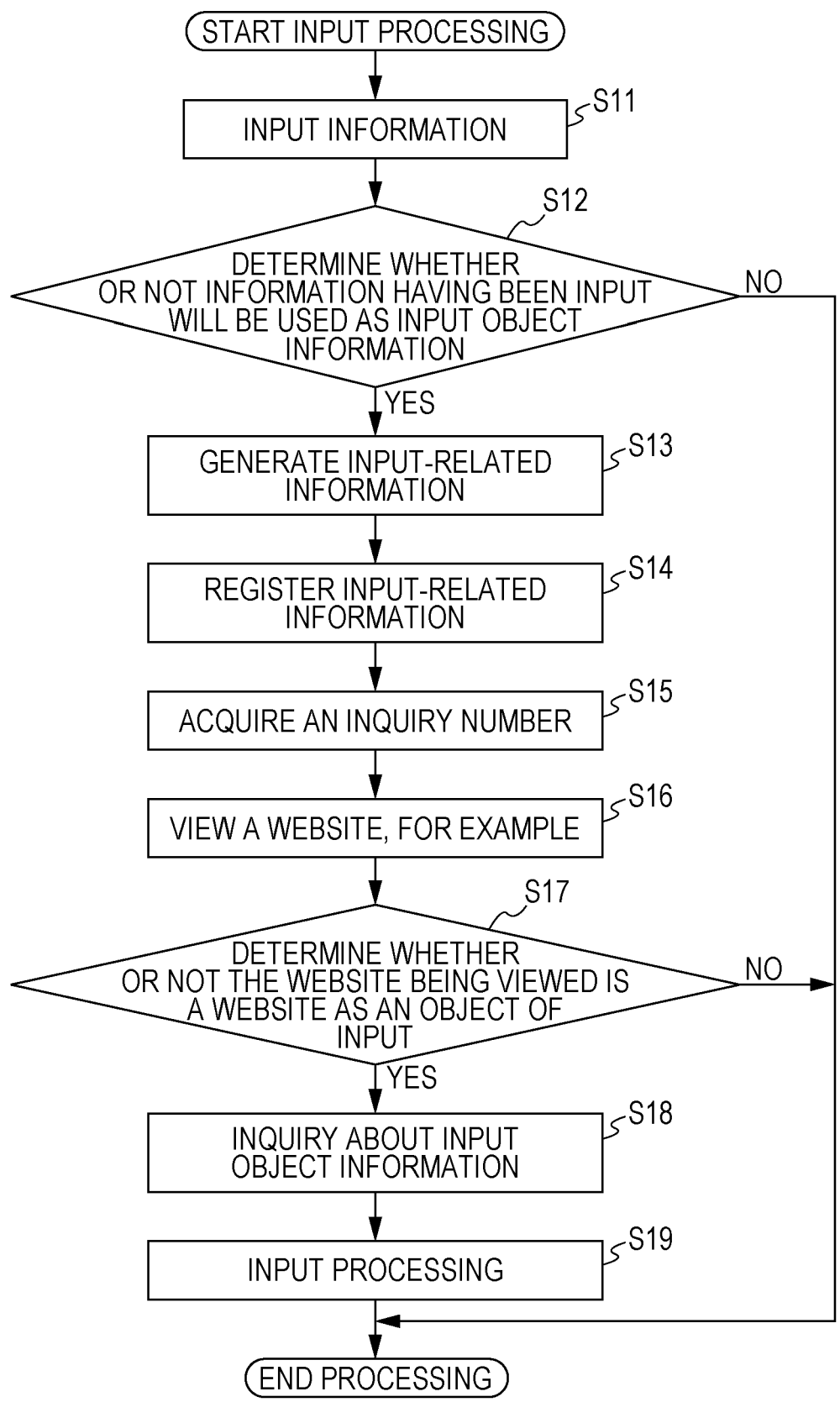
FIG. 5 is a flow chart for describing a flow of input processing executed by the information processing device in FIG. 2 having the functional configuration in FIG. 3.

FIG. 5 is a flow chart for describing a flow of input processing executed by the information processing device 1 in FIG. 2 having the functional configuration in FIG. 3. In the embodiment, an example will be described in which once ID and a password are input while a website is being viewed, the ID and the password will be used as input information. The input processing is started by the operation of input processing performed on the input unit 17 by a user.

In Step S11, the input detecting unit 51 detects input of information such as ID and a password while a website is being viewed.

In Step S12, the input detecting unit 51 determines whether or not the information having been input will be used as input object information. If the information having been input will be used as input object information, the input detecting unit 51 detects an operation for that determination. If the information having been input will not be used as input object information, Step S12 makes a judgment of NO and the input processing ends. If the information having been input will be used as input object information, Step S12 makes a judgment of YES and the procedure moves on to Step S13.

In Step S13, the information generation unit 52 generates input-related information. Specifically, the information generation unit 52 generates information with the items of "inquiry of input object information", "input destinations", and "storage destinations of input object information", for storage in the information processing device 1. Further, the information generation unit 52 generates, for each input set, input object information for an input destination for storage in the wrist terminal 2.

In Step S14, the memory control unit 53 and the communication control unit 54 register input-related information. Specifically, the memory control unit 53 allows information with the items of "input destinations" and "storage destinations" as shown in FIG. 4A of information to be input, to be stored into the input processing information storage unit 71 for storage in the information processing device 1. Further, the communication control unit 54 outputs, for each input set, input object information for an input destination for storage in the wrist terminal 2.

In Step S15, the communication control unit 54 acquires an inquiry number. In other words, the communication control unit 54 acquires from the wrist terminal 2 an inquiry number for the output input object information.

In Step S16, the output control unit 55 controls an output unit 18-1 so that a website is output for viewing.

In Step S17, the input object determination unit 56 determines whether or not a website being viewed is a website as an object of input. More specifically, the input object determination unit 56 makes a determination by checking against a list of input destinations stored in the input processing information storage unit 71. If the website being viewed is not an object of input, Step S17 makes a judgment of NO and the input processing ends. If the website being viewed is an object of input, Step S17 makes a judgment of YES and the procedure moves on to Step S18.

In Step S18, the communication control unit 54 makes an inquiry about the input object information. More specifically, the communication control unit 54 sends an inquiry to the wrist terminal 2 about the input object information by the inquiry number for the input destination stored in the input processing information storage unit 71. As a result of the inquiry, the communication control unit 54 acquires the input object information from the wrist terminal 2. It is to be noted that the input object information may be output only when the wrist terminal 2 has determined that the information processing device 1 is paired.

In Step S19, the input processing unit 57 executes input processing. More specifically, the input processing unit 57 inputs the input object information acquired from the wrist terminal 2 into an input destination (website, for example) as input processing. A user can log-in with the input information (ID and a password).

Figure 6:
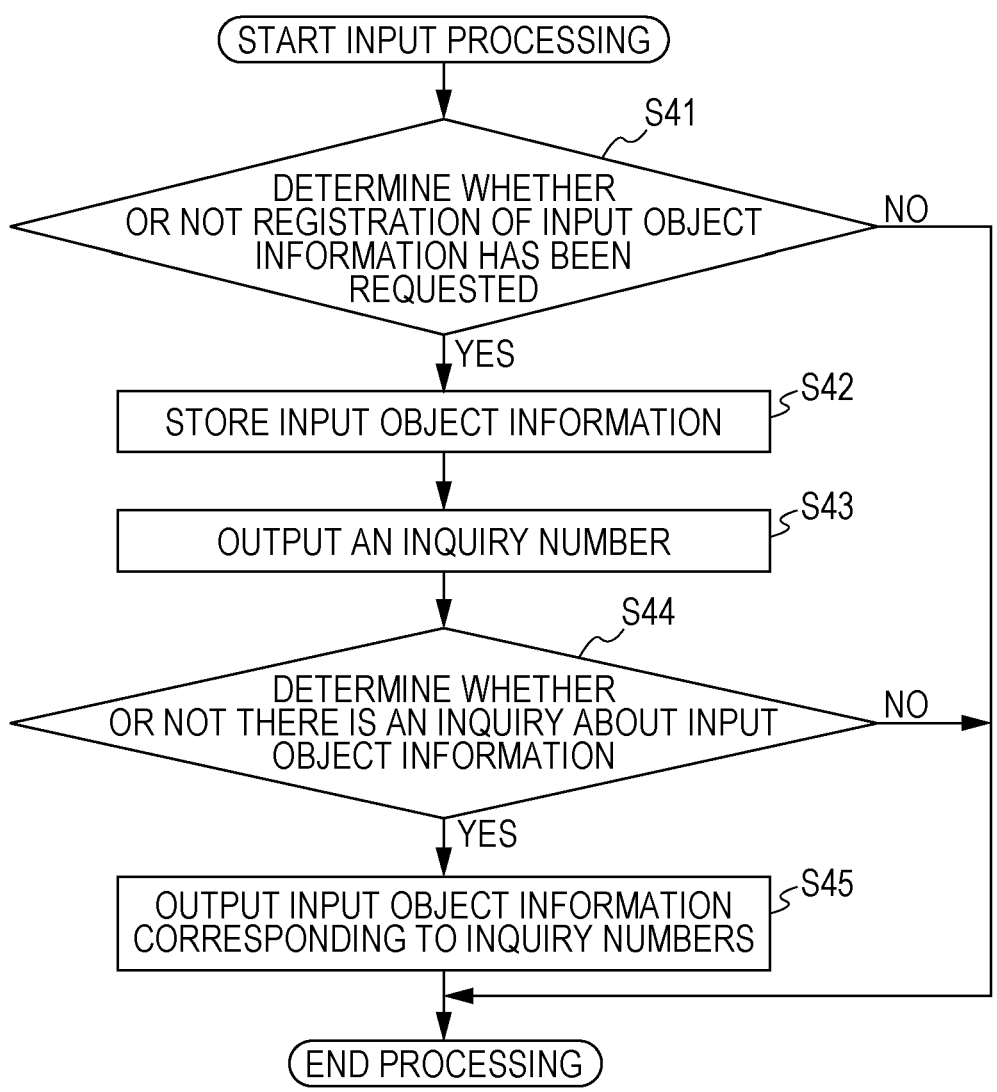
FIG. 6 is a flow chart for describing a flow of input processing executed by the wrist terminal in FIG. 2 having the functional configuration in FIG. 3.

FIG. 6 is a flow chart for describing a flow of input processing executed by the wrist terminal 2 in FIG. 2 having the functional configuration in FIG. 3.

In Step S41, the communication control unit 91 determines whether or not registration of input object information has been requested. If there is no request for the registration, Step S41 makes a judgment of NO and the input processing ends. If there is a request for the registration, Step S41 makes a judgment of YES and the procedure moves on to Step S42.

In Step S42, the memory control unit 92 makes the input information stored. More specifically, the memory control unit 92 controls the inquiry information storage unit 111 so that the input object information is stored. In the control, the memory control unit 92 issues an inquiry number according to an input destination. Consequently, the memory control unit 92 allows the information indicated in FIG. 4B to be stored in the inquiry information storage unit 111.

In Step S43, the communication control unit 91 outputs the inquiry numbers to the information processing device 1. More specifically, the communication control unit 91 controls the communication unit 20 so that the inquiry numbers are output to the information processing device 1.

In Step S44, the communication control unit 91 determines whether or not there is an inquiry about the input object information. If there is no inquiry about the input object information, Step S44 makes a judgment of NO and the input processing ends. If there is an inquiry about the input object information, Step S44 makes a judgment of YES and the procedure moves on to Step S45.

In Step S45, the communication control unit 91 outputs the input object information corresponding to the inquiry numbers. In other words, the communication control unit 91 controls the communication unit 20 so that the input object information corresponding to the inquiry numbers are output to the information processing device 1.

With the input system S thus configured, the security is not easily compromised even if the information processing device 1 or the wrist terminal 2 is accidentally left, unless the devices are hold. In this way, it becomes possible to prevent, without fail, highly confidential information such as a password and personal information from being automatically input into a form by an input information management application or the cloud service, for example. Further, since the wrist terminal 2 is worn on an arm of a user, the user can automatically input information including ID and a password only by operating the information processing device 1 without performing the input operation. Further, since the information processing device 1 and the wrist terminal 2 communicate with each other by short-distance communication, encryption and digital sign are enabled with hardware security codes including a device serial number and a media access control address (MAC) number. This achieves reduction in the risk of hacking, for example, more than when a device connected to the Internet or a mobile net, for example, is used. In addition, dealing with only information that relates to required input information can make the risk of hacking, etc. lower than when all the information is integrally managed.

The information processing device 1 formed described above includes the communication control unit 54 and the input processing unit 57. The communication control unit 54 controls the communication unit 20 so that input object information to be information for performing input is registered into the wrist terminal 2 as an external device. The communication control unit 54 further controls the communication unit 20 so that an inquiry number serving as management information for the registered input object information is acquired from the wrist terminal 2. The communication control unit 54 further controls the communication unit 20 based on the acquired inquiry information so that input object information is acquired. The input processing unit 57 performs input into an input destination based on the input object information of which acquisition is controlled by the communication control unit 54. In this way, the input object information is managed by an external device with no direct involvement of the information processing device 1, so that the security is improved.

The wrist terminal 2 is a paired device. Hence, the information processing device 1 performs communication with devices with security of higher levels.

Further, the input system S employs the wrist terminal 2 performing short-distance communications. In the input system S, since the wrist terminal 2 is worn on an arm of a user, the user can automatically input information including ID and a password only by operating the information processing device 1 without performing the input operation. In addition, the wrist terminal 2 does not function when it gets stolen to a place far away from the information processing device 1

The communication control unit 54 registers secure information including ID and a password necessary for logging into a website, for example, into the wrist terminal 2 as input object information. In this way, the input object information is managed by an external device with no direct involvement of the information processing device 1, so that the security is improved.

In the meanwhile, the present invention is not limited to the above embodiment and includes variations and modifications that occur within the range in which the objects of the present invention can be accomplished.

While information having been input is set to be automatically input in the embodiment, the information having been input may be selectively input by a user in a manner such the user sees the displayed candidates of the information.

Further, while as the information processing device 1 and the wrist terminal 2 in the input system S according to the present invention, a smartphone and a watch device are used, respectively, in the embodiment, they are not the only examples of the information processing device 1 and the wrist terminal 2. For example, the present invention is applicable to general electronic devices with an input processing function. More specifically, the present invention is applicable to notebook-sized personal computers, printers, television receivers, video cameras, mobile navigation devices, mobile phones, smartphones, portable game machines, and so forth.

The series of processing described above can be executed by either hardware or software. In other words, the functional configuration in FIG. 3 is only exemplary. It is sufficient if the information processing device 1 is equipped with functions that can practically execute the series of processing and any other functional block than that in FIG. 3 may be used for realizing the functions. Further, a single function block may be formed of hardware only, software only, or a combination of hardware and software.

If the series of processing is to be executed by software, the programs of the software are installed from a network or a recording medium into a computer, for example. The computer may be a computer build in dedicated hardware, or be a computer such as a general personal computer that is capable of executing different functions with different programs installed therein.

The recording medium having the programs includes not only the removable media 31 in FIG. 2 distributed separately from the device body to a user for providing the user with programs but also a recording medium built in the device body in advance and provided to the user. The examples of the removable media 31 include a magnetic disk (floppy disk, for example), an optical disk, and a magneto-optical disk. The examples of the optical disk include a compact disk-read only memory (CD-ROM), a digital versatile disk (DVD), and a Blu-ray Disc (registered trademark). The magneto-optical disk is an MD (Mini-Disk), for example. Further, the recording medium built in the device body in advance and provided to the user is the ROM 12 in FIG. 2 storing programs or hardware contained in the storage unit 19 in FIG. 2, for example.

In the specification, the steps of describing the programs stored in the recording medium include not only processing performed in accordance with the order of the steps but also processing performed in parallel with one another or individually performed. Further, in the specification, the terms for the system denote an overall device including a plurality of devices or units.

While several embodiments of the present invention have been described, the embodiments are only exemplary and do not limit the technical range of the present invention. It should be understood that the present invention may be implemented in other different embodiments and various kinds of alterations including omissions and replacements may occur as long as they are within the gist of the present invention. The embodiments and modified examples are within the scope and gist of the invention described in the specification, etc., and within the scope of the invention described in the appended claims or the equivalents thereof.

What is claimed is:

1. An input processing system comprising:
an information storage device; and
an information processing device,
wherein the information storage device and the information processing device are two separate, individually operable devices,
wherein each of the information storage device and the information processing device stores at least one inquiry number used at a time of inquiring about acquisition of information for performing input processing,
wherein the information storage device includes:

an input information memory configured to store (i) plural sets of the information for performing input processing, the information for performing input processing being information to be input to an input destination, and the input destination being associated with URL information and being stored in the information processing device, and (ii) plural inquiry numbers used for identifying the plural sets of the information for performing input processing, each of the plural sets of the information for performing input processing corresponding to one of the plural inquiry numbers stored in the input information memory; and a first processor which executes programs stored in a memory to perform functions including:

receiving one inquiry number transmitted from the information processing device; and transmitting, to the information processing device, the set of the information for performing input processing stored in the input information memory in correspondence with a same inquiry number as the one inquiry number received from the information processing device; and wherein the information processing device includes:

an identification information memory configured to store (i) plural inquiry numbers used at the time of inquiring about acquisition of the information for performing input processing, and (ii) plural pieces of storage destination information, each of the plural pieces of storage destination information identifying a location at which a respective set of the information for performing input processing is stored, and each of the plural pieces of storage destination information corresponding to one of the plural inquiry numbers stored in the identification information memory; and a second processor which executes programs stored in a memory to perform functions including:

transmitting the one inquiry number to the information storage device based on one of the plural pieces of storage destination information identifying the information storage device, wherein in the transmitting function of the second processor, the one inquiry number is transmitted without also transmitting the input destination stored in the information processing device in association with the one inquiry number; and receiving the set of the information for performing input processing transmitted by the information storage device.

2. The input processing system according to claim 1, wherein the functions performed by the first processor further include determining whether or not the information processing device, to which the set of the information for performing input processing is transmitted, is paired, and wherein the first processor transmits the set of the information for performing input processing in a case in which it is determined that the information processing device is paired.

3. The input processing system according to claim 1, wherein the functions performed by the second processor further include executing input processing based on the received set of the information for performing input processing.

4. An information storage device comprising:

a memory configured to store (i) plural sets of information for performing input processing, the information for performing input processing being information to be input to an input destination, and the input destination being associated with URL information and being stored in an external device, and (ii) plural inquiry numbers used for identifying the plural sets of the information for performing input processing, each of the plural sets of the information for performing input processing corresponding to one of the plural inquiry numbers stored in the information storage device; and a processor which executes programs stored in a memory to perform functions including:

receiving, from the external device, one inquiry number stored in the external device in association with one of plural pieces of storage destination information stored in the external device, each of the plural pieces of storage destination information indicating a location at which a respective set of the information for performing input processing is stored, wherein in the receiving, the one inquiry number is received from the external device without also receiving the input destination stored in the external device in association with the one inquiry number; and transmitting, to the external device, the set of the information for performing input processing stored in the information storage device in correspondence with a same inquiry number as the one inquiry number received from the external device, wherein the information storage device and the external device are two separate, individually operable devices.

5. An information processing device comprising:

a memory configured to store (i) plural inquiry numbers used at a time of inquiring about acquisition of information for performing input processing, the information for performing input processing being information to be input to an input destination, the input destination being stored in the information processing device and being associated with URL information, and the information for performing input processing being stored in an external device, and (ii) plural pieces of storage destination information, each of the plural pieces of storage destination information identifying a location at which a respective set of the information for performing input processing is stored, and each of the plural pieces of storage destination information corresponding to one of the plural inquiry numbers stored in the information processing device; and a processor which executes programs stored in a memory to perform functions including:

transmitting one inquiry number to the external device based on one of the plural pieces of storage destination information identifying the external device, wherein in the transmitting process, the one inquiry number is transmitted without also transmitting the input destination stored in the information processing device in association with the one inquiry number; and receiving, from the external device, the set of the information for performing input processing stored in the external device in correspondence with a same inquiry number as the one inquiry number transmitted to the external device, wherein the external device and the information processing device are two separate, individually operable devices.

6. An input method that is executed by an information storage device having an input information memory and by an information processing device having an identification information memory, the information storage device and the information processing device being two separate, individually operable devices, each of the information storage device and the information processing device storing at least one inquiry number used at a time of inquiring about acquisition of information for performing input processing, the input information memory being configured to store (i) plural sets of the information for performing input processing, the information for performing input processing being information to be input to an input destination, and the input destination being associated with URL information and being stored in the information processing device, and (ii) plural inquiry numbers used for identifying the plural sets of the information for performing input processing, each of the plural sets of the information for performing input processing corresponding to one of the plural inquiry numbers stored in the input information memory, and the identification information memory being configured to store (i) plural inquiry numbers used at the time of inquiring about acquisition of the information for performing input processing, and (ii) plural pieces of storage destination information, each of the plural pieces of storage destination information identifying a location at which a respective set of the information for performing input processing is stored, and each of the plural pieces of storage destination information corresponding to one of the plural inquiry numbers stored in the identification information memory, the input method comprising:

transmitting one inquiry number to the information storage device by the information processing device based on one of the plural pieces of storage destination information identifying the information storage device, wherein in the transmitting, the one inquiry number is transmitted without also transmitting the input destination stored in the information processing device in association with the one inquiry number; and outputting, by the information storage device to the information processing device, the set of the information for performing input processing stored in the input information memory in correspondence with a same inquiry number as the one inquiry number transmitted by the information processing device.

7. The input processing system according to claim 1, wherein the input processing system comprises a plurality of the information storage devices, wherein the storage destination information includes a storage region of any of the plurality of information storage devices as a storage destination, and wherein the second processor transmits the one inquiry number to one of the plurality of the information storage devices which corresponds to the storage destination information.

8. The input processing system according to claim 3, wherein the functions performed by the second processor further include detecting an input operation by a user, and wherein the second processor transmits the one inquiry number to the information storage device based on the storage destination information identifying the information storage device when the input operation is detected.

9. The input processing system according to claim 8, wherein the identification information memory stores the input destination information in association with a respective combination of one of the plural inquiry numbers used at the time of inquiring about acquisition of the information for performing input processing and one of the plural pieces of storage destination information, wherein the second processor detects the input operation for an input destination that depends on the input destination information, and wherein the second processor transmits the one inquiry number to the information storage device based on the storage destination information identifying the information storage device when the input operation is detected.

10. The input processing system according to claim 1, wherein the functions performed by the second processor further include detecting an input operation by a user, and wherein the identification information memory stores one inquiry number that depends on the input operation and a corresponding piece of the storage destination information in association with each other when the input operation is detected.

11. The input processing system according to claim 9, wherein the input information memory stores one inquiry number that depends on the input operation and a corresponding set of the information for performing input processing in association with each other when the input operation is detected.

12. The input processing system according to claim 1, wherein the information storage device includes a wearable terminal capable of being mounted on a body of a user.

13. The input processing system according to claim 2, wherein the functions performed by the second processor further include executing input processing based on the received set of the information for performing input processing.

14. The input processing system according to claim 13, wherein the functions performed by the second processor further include detecting an input operation by a user, and wherein the second processor transmits the one inquiry number to the information storage device based on the storage destination information identifying the information storage device when the input operation is detected.

15. The input processing system according to claim 14, wherein the identification information memory stores the input destination information in association with a respective combination of one of the plural inquiry numbers used at the time of inquiring about acquisition of the information for performing input processing and one of the plural pieces of storage destination information, wherein the second processor detects the input operation for an input destination that depends on the input destination information, and wherein the second processor transmits the one inquiry number to the information storage device based on the storage destination information identifying the information storage device when the input operation is detected.

16. The input processing system according to claim 15, wherein the input information memory stores one inquiry number that depends on the input operation and a corresponding set of the information for performing input processing in association with each other when the input operation is detected.

17. The input processing system according to claim 1, wherein the input processing is a process of acquiring information necessary for accessing the input destination, from among plural input destinations stored in the identification information memory, and automatically inputting the acquired information when the information processing device accesses the input destination.

* * * * *